United States Patent
Reddy et al.

(10) Patent No.: US 12,375,386 B1
(45) Date of Patent: Jul. 29, 2025

(54) DYNAMIC ROUTING CONFIGURATION

(71) Applicant: Citibank, N.A., New York, NY (US)

(72) Inventors: Umesh Reddy, Irving, TX (US); Ranjith Duligunti, Irving, TX (US); Akash Gujarathi, Irving, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/189,911

(22) Filed: Apr. 25, 2025

(51) Int. Cl.
H04L 45/02 (2022.01)

(52) U.S. Cl.
CPC ................... H04L 45/02 (2013.01)

(58) Field of Classification Search
CPC ....................................... H04L 45/02
USPC .......................................... 709/238
See application file for complete search history.

(56) References Cited

U.S. PATENT DOCUMENTS

| | | | | |
|---|---|---|---|---|
| 10,255,303 | B1* | 4/2019 | Britton | G06F 16/972 |
| 2016/0162478 | A1* | 6/2016 | Blassin | G06Q 10/063112 706/12 |
| 2023/0359513 | A1* | 11/2023 | Tummala | G06F 9/5005 |

* cited by examiner

Primary Examiner — Anthony Mejia
(74) Attorney, Agent, or Firm — Perkins Coie LLP

(57) ABSTRACT

Systems and methods are described herein for providing seamless service route updates for service routing platforms. When a request for a new service route is received, the system may use the data within the request to transform the service route into a format supported by one or more platforms that will have the route setup. Once the transformation has been completed, the system may store the transformed service route or service routes in a route repository. In addition, the system may store the service route in a standardized format separately. The system may then determine that a new service route has been added and match the new service route with one or more service routing platforms. Once the match has been made, for each service route, the system may transmit the transformed service routes to the corresponding service routing platforms.

20 Claims, 5 Drawing Sheets

| Name | Value |
|---|---|
| Route_ID | ed0762875732e86365e841e92bfc50d8c |
| Route Parameters | <parameters> |
| Platforms | Platform_1<br>Platform_2 |

200

203 — Route_ID
206 — Route Parameters
209 — Platforms

FIG. 2

| Route ID | Route Parameters | Platform IDs |
|---|---|---|
| R_01 | <R_01 params> | Platform_1<br>Platform_2<br>Platform_3 |
| R_02 | <R_02 params> | Platform_1<br>Platform_2 |
| R_03 | <R_03 params> | Platform_1<br>Platform_3 |
| R_04 | <R_04 params> | Platform_3 |

FIG. 3

DYNAMIC ROUTING CONFIGURATION

BACKGROUND

Many computing environments use hybrid systems to serve information to users. For example, some environments include a mix of on-premises environments and cloud environments. These environments may have services in the cloud while having data sources to feed those services on-premises. Accordingly, an efficient routing infrastructure is needed to route the requests from each service to the proper data source or data sources. When the routes are established, the routing may be performed by the systems. However, updating those routes may cause technical issues because routing devices have historically needed to be restarted when an updated is needed. The restarts historically have been time-consuming and caused service interruptions. In addition, if it takes too long to add a route to the environment, new services may not be able to be deployed quickly enough.

SUMMARY

To address these and other issues an operation is disclosed herein for providing seamless route updates for routing platforms. A route configuration system may be used to perform operations described herein. When a request for a new service route is received, the route configuration system may use the data within the request (e.g., the received route in a standardized format) to transform the new service route into a format supported by one or more platforms that will have the route set up. Once the transform has been completed, the route configuration system may store the transformed route or routes (e.g., when multiple routing platforms need the route), i.e., the new service route or routes, in a route repository. In addition, the route configuration system may store the new service route in a standardized format separately. The system may then determine that a new service route has been added and match the new route with one or more service routing platforms. Once the match has been made, for each new service route, the route configuration system may transmit the transformed routes to the corresponding service routing platforms.

The route configuration system may perform the following operations to configure service routes. In some embodiments, the route configuration system may receive, from an operator, a request for a new service route. The new service route may enable an application programming interface (API) to route incoming service requests via the new service route to a corresponding service provider. Alternatively or additionally, the new service route may be configured for routing to a corresponding service provider via an application programming interface. In addition, the request may include the new service route in a standardized format having service route metadata. For example, the environment may be used to store all routes in a standardized format such that any route may be transformed to a platform specific route as needed. This solves an existing problem of routes being stored in platform specific formats within the platforms themselves causing update issues when the route needs to be added to a new platform or updated. Thus, the new route may be stored in a standardized route repository that stores all the standardized routes for all platforms within the environment. In some embodiments, the operator may be someone who has permissions to add/remove routes from the environment.

When the route is received, the route configuration system may identify various service routing platforms that require the route. In particular, the route configuration system may determine, based on the service route metadata, a plurality of service routing platforms for using the new service route. In some embodiments, each service routing platform may be associated with corresponding transform code. For example, the received new route may include identifications of the service routing platforms that need the route. Thus, the route configuration system may use those identifiers to determine which transform code to use for the identified service routing platforms and may transform the new service route from the standardized format into a platform specific format for each service routing platform.

The route configuration system may then perform a transform of the new service route into formats compatible with the different service routing platforms. In particular, the route configuration system may transform, using each corresponding transform code, the new service route in the standardized format into a plurality of service routes for the plurality of service routing platforms. Each service route may be transformed, using the corresponding transform code, into a corresponding format compatible with a corresponding service routing platform. Furthermore, each service route may include one or more indications of the corresponding service routing platforms. For example, the route configuration system may use transform code for each service routing platform to transform the rule in the standardized format into a platform supported format. In some embodiments, templates may be used or another type of transform.

When the platform specific service routes have been created, those routes may be stored in a repository while the new service route in the standardized format may be stored separately. In particular, the route configuration system may store the new service route in the standardized format within a platform agnostic route repository. In addition, the route configuration system may store the plurality of service routes in a native route repository for each service routing platform. For example, route configuration system may maintain a repository (e.g., a database or a database table) for the standardized routes and one or more repositories (e.g., databases or database tables) for platform specific service routes. The service routes in the standardized format may be stored so that updates may be performed automatically from a single source. For example, when an update or a modification of a service route is performed to a service route in a standardized format, the system may update all the platform specific service routes.

In some embodiments, the route configuration system may detect that the native route repository has been modified with the plurality of service routes. For example, the route configuration system may be monitoring the native route repository or multiple native route repositories for any changes within the repository. The changes may include one or more new service routes or route updates to already existing service routes. When the route configuration system detects an update (e.g., a new platform specific service route being added for one or more service routing platforms), the route configuration system may process the update as described below.

The route configuration system may match each service route of the plurality of service routes with the corresponding service routing platform of the plurality of service routing platforms. For example, the route configuration system may retrieve each service route (e.g., in a format supported by the corresponding routing platform) and identify the corresponding service routing platform. When the matching is done, the route configuration system may have an address or another identifier of where the route may be sent so that it can be installed within the corresponding service routing platform.

The route configuration system may then transmit, to each of the plurality of service routing platforms, a corresponding command to update each routing platform with a corresponding service route of the plurality of service routes. Each command may include the corresponding service route formatted for the corresponding service routing platform. For example, the route configuration system may use the address or another identifier of where the route may be sent to send the service route to the corresponding service routing platform. Each service routing platform may perform the installation of the route.

In some embodiments, a plugin may detect the new routes and may be used to install the routes into each corresponding service routing platform. For example, each service routing platform may use a different update operation. One example of the update operation may be to use a mapping to store the service routes. The mapping may be stored in memory and the service routing platform may refer to the mapping when attempting to perform the routing operations. Thus, the plugin may update the mapping with the new service route.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

BRIEF DESCRIPTION OF THE DRAWINGS

FIG. 2 illustrates an example of a data structure representing a service route, in accordance with some embodiments of this disclosure.

FIG. 3 illustrates an excerpt of a data structure for storing service routes in a generalized format, in accordance with some embodiments.

DETAILED DESCRIPTION

Figure 1:
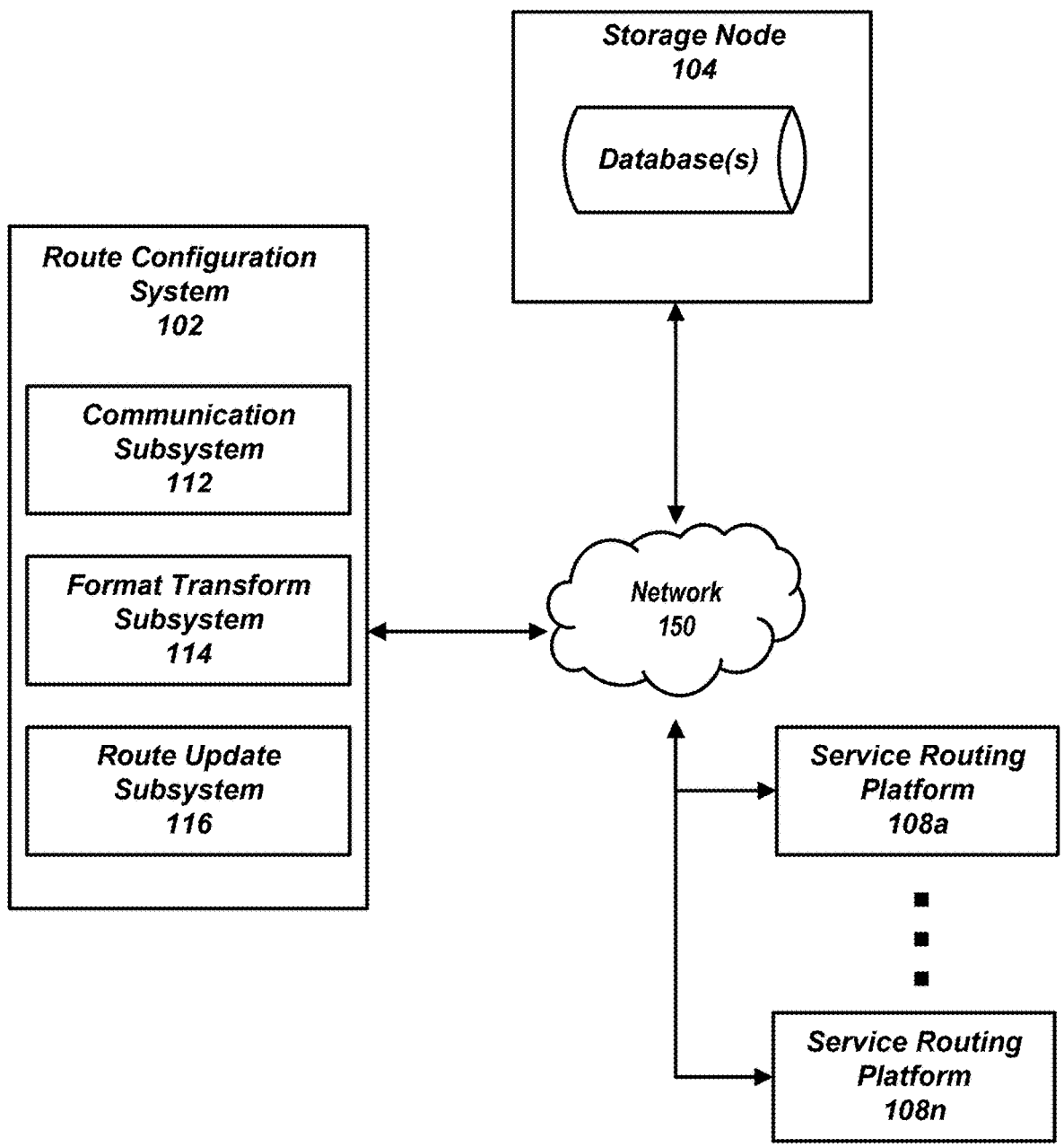
FIG. 1 illustrates an example computing environment for providing service route updates for service routing platforms, in accordance with some embodiments of this disclosure.

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Attempting to create a system for providing service route updates for service routing platforms in view of the available conventional approaches created significant technological uncertainty. Creating such system required addressing several unknowns in conventional approaches in flexibility and availability, such as conventional systems requiring a lengthy restart when the update process is executed, thereby making the system inflexible (e.g., due to downtime during the restart and time delays to add new service routes).

Conventional approaches rely on static system architecture that requires a restart for every change, which does not work in many environments. Specifically, the pace of change and availability requirements for current systems make those issues unacceptable. Conversely, the disclosed system enables deployment of service routes (e.g., routing rules) without a restart of the system and thus shortening delays in new service route implementations.

Additionally, system restarts due to risks of systems crashing or otherwise breaking during restarts created further technological uncertainty, since the legacy system may not come back online after a restart. As a result, legacy systems are not often updated with new service routes, requiring delays in new services being added to the environment. To successfully integrate legacy systems with new requirements, system complexity must be taken into consideration.

To overcome the technological uncertainties, the inventors systematically evaluated multiple design alternatives. For example, the inventors reviewed various service platform specifications and program code to determine how to prevent restarts. The inventors also experimented with different route repository architectures, which allowed the inventors to design a flexible system with both standardized service routes and platform specific service routes to be stored for more flexible and efficient processing of updates.

The use of other architectures proved to be ineffective as those other architectures failed to prevent the issue described above, leading to the same issues of restarts and delays.

Thus, the inventors experimented with different methods for different architectures to identify the most efficient and effective approaches. Additionally, the inventors systematically evaluated different strategies for different architectures for storage and access of service routes as well as different update processes. The inventors evaluated different methods of performing service route updates and architecture updates, such as it became clear that the architecture of having the service routes stored in a standardized format so that they can be easily changed and updated. Furthermore, having the service routes in platform native formats enabled the flexibility to quickly update specific service routing platforms without having to restart those platforms or manually translate the service routes.

FIG. 1 shows an example system 100 for providing route updates for service routing platforms. System 100 includes route configuration system 102, storage node 104, and service routing platforms 108a-108n. Route configuration system 102 may execute instructions for providing route updates for service routing platforms. Route configuration system 102 may include software, hardware, or a combination of the two. For example, route configuration system 102 may be a physical computing device or a virtual computing device that is running on a physical computing device. Route configuration system 102 may be hosted on a personal computer, a smart phone, a laptop computing device, an electronic tablet, or another suitable computing device. In some embodiments, route configuration system 102 may be hosted on a cloud computing device and may be accessed by a thin client. Some components of route configuration system 102 may be hosted on a server device (e.g., storage node 104). Route configuration system 102 may include communication subsystem 112, format transform subsystem 114, and route update subsystem 116. Route configuration system 102 may include other components (e.g., as described in FIG. 4).

Communication subsystem 112 may include software components, hardware components, or a combination of both. For example, communication subsystem 112 may include a network card (e.g., a wireless network card and/or a wired network card) that is coupled with software to drive the card. Format transform subsystem 114 may include software components, hardware components, or a combination of both. For example, format transform subsystem 114 may include software components that access data in memory and/or storage and may use one or more processors to perform its operations. Route update subsystem 116 may include software components, hardware components, or a combination of both. For example, route update subsystem 116 may include software components that access data in memory and/or storage and may use one or more processors to perform its operations.

Storage node 104 may host components associated with route configuration system 102 as well as other server components. In some embodiments, storage node 104 may host service routes in a standardized format and/or service routes in platform native format. Storage node 104 may include software, hardware, or a combination of the two. For example, storage node 104 may be a physical server or may be a virtual server that is running on a physical computer system. Network 150 may be a local area network (LAN), a wide area network (WAN) (e.g., the Internet), or a combination of the two. Service routing platforms 108*a*-108*n* may include components similar to components of route configuration system 102.

In some embodiments, route configuration system 102 may perform the following operations to provide route updates for service routing platforms. Route configuration system 102 may (via communication subsystem 112) receive, from an operator, a request for a new service route. The new service route may enable an application programming interface to route incoming service requests via the new service route. Alternatively or additionally, the new service route may be configured to route to a corresponding service provider via an application programming interface Furthermore, the request may include the new service route in a standardized format. For example, a new service may be being installed within the environment. As part of the new service, a new service route may be necessary so that a service routing platform is enabled to route the service requests to appropriate sources of data (e.g., an appropriate service provider). Thus, the operator may submit a request for a new route to be added to one or more service routing platforms. The route may be submitted in a standardized version and may include service route metadata. The service route metadata may include one or more indications of which service routing platforms will need the route. Thus, the new service route may include corresponding service route metadata indicating one or more service routing platforms for the new service route.

FIG. 2 illustrates an example of a data structure 200 representing a service route. Field 203 is shown as storing a route identifier. A route identifier may be a decimal number, a hexadecimal number, a string, and/or another suitable element. The route identifier may be used to retrieve, modify, or delete a particular service route. In some embodiments, a service route may be referred to as a rule. Thus, the route identifier may be a rule identifier. Field 206 may store service route parameters. For example, service route parameters may include a location for the target data provider and other suitable information. Field 209 may store one or more platforms for installing the service route. The data in field 209 may be used to determine which platform specific service routes to generate, as will be discussed later in this disclosure.

When the request is received, communication subsystem 112 may pass the received data to format transform subsystem 114. Format transform subsystem 114 may identify to which service routing platform or platforms the new service route will be installed. For example, format transform subsystem 114 may determine, based on service route metadata associated with the new service route, a plurality of service routing platforms for the new service route. In some embodiments, format transform subsystem 114 may use the metadata and/or data in a field of a new service route in a standardized format (e.g., field 209) to determine which platforms will use the route. In one example, each service routing platform may be associated with a transform code. The transform code may be a script or a program that translates or transforms the service route from a generalized format to a platform specific format. The transform code for each platform may be stored in an assigned location (e.g., on storage node 104) and may be executed by format transform subsystem 114.

In some embodiments, each service routing platform of the plurality of service routing platforms may be associated with corresponding transform code. For example, as described above, the transform code may be generated to transform or translate the service routes in the standardized format into service routes in platform specific formats. The transform code for each platform may be provided by the platform creator or may be developed by an operator of the system or another developed. As discussed above, each service route of the plurality of service routes may include one or more indications of the corresponding service routing platform. Accordingly, format transform subsystem 114 may retrieve corresponding transform code for each service routing platform for which the service route will be generated.

When the transform code is identified for each service routing platform, format transform subsystem 114 may perform the transform operations. In particular, format transform subsystem 114 may transform the new service route in the standardized format into a plurality of service routes for the plurality of service routing platforms. Each service route of the plurality of service routes may be transformed into a corresponding format compatible with a corresponding service routing platform. For example, the environment may include four different service routing platforms, and the service route may be determined to be associated with three of the four service routing platforms. That is, the metadata or data received as part of the request may indicate the identifier of the service routing platforms that will host the service route.

In some embodiments, the transform code for each service routing platform may be part of an application programming interface. Thus, the transform code may take, as input, the service route in standardized format and the identifiers of the service routing platforms. The transform code may then transform the new service route into platform specific service routes (e.g., formats that are supported and/or read by the corresponding service routing platforms). In some embodiments, format transform subsystem 114 may retrieve corresponding transform code for each service routing platform. Format transform subsystem 114 may then input the new service route in the standardized format into each transform code for each service routing platform. Each transform code may output the new service route in a platform specific format. When each platform specific service route has been generated, it may be associated with the corresponding service routing platform. That is, each service route of the plurality of service routes may include a corresponding indication of the corresponding service routing platform.

In some embodiments, format transform subsystem 114 may store the generated routes in a route repository (e.g., on storage node 104). In particular, format transform subsystem 114 may store the plurality of service routes in a native route repository for each service routing platform. For example, the repository may be a database or a database table that stores the service routes. In some embodiments, there may be a single database table that stores all the service routes for all the service routing platforms. In yet some embodiments, there may be a database table of service routes for each routing platform. Other storage may be used to store the service routes. For example, the service routes may be stored in files (e.g., Extensible Markup Language (XML) files) or within other suitable data structures.

In some embodiments, format transform subsystem 114 may store the new service route in the standardized format within a platform agnostic route repository. For example, route configuration system 102 may maintain a database or a database table of all routes. FIG. 3 illustrates an excerpt of a data structure 300 (e.g., a database table) for storing service routes in a generalized format. Field 303 stores a route identifier, which may be a string, a number, a hexadecimal variable, or another suitable identifier. Field 306 stores one or more route parameters such as destination for the data provider and/or other suitable parameters. Field 309 may store the platform identifiers identifying platforms onto which the service route has been installed or should be installed. Data structure 300 may be a database table, a file (e.g., an XML file), or another suitable data structure.

When format transform subsystem 114 finishes the storage operations, format transform subsystem 114 may pass the processing to route update subsystem 116. In some embodiments, route update subsystem 116 may be monitoring each native route repository, platform agnostic route repository, or both. Thus, route update subsystem 116 may detect that a native routing repository has been modified with the plurality of service routes. As discussed above, the native routing repository may store service routes in a platform specific format. In some embodiments, route update subsystem 116 may be built in a form of a plugin that monitors a native routing repository or native routing repositories (if there are multiple) for changes. For example, when a new service route is added to the native routing repository or a service route is modified or deleted from the native routing repository, route update subsystem 116 (e.g., the plugin) may receive a notification. If multiple repositories are updated (e.g., with a new service route), route update subsystem 116 may retrieve those service routes from the multiple repositories.

In some embodiments, route update subsystem 116 may match service routes in their platform specific formats with the corresponding service routing platforms. In particular, route update subsystem 116 may match each service route of the plurality of service routes with the corresponding service routing platform of the plurality of service routing platforms. For example, when route update subsystem 116 determines that multiple platform specific repositories have been updated or a single repository holding all platform specific service routes has been updated with multiple new service routes, route update subsystem 116 may retrieve the services routes and match those service routes (e.g., based on a platform identifier) with a corresponding service routing platform so that the service routes may be sent to the matching platforms.

When the platform specific service routes have been generated, those service routes may be transmitted to the matching service routing platforms. In particular, route update subsystem 116 may transmit, to the plurality of service routing platforms, a command to update each service routing platform with a corresponding service route of the plurality of service routes. In some embodiments, the plugin may be configured to update each platform by injecting the service route into a particular location within the service routing platform. This enables the plugin to update each service routing platform without having to restart that platform, thereby avoiding delays in adding new service routes and disruptions in service during the restart time.

In some embodiments, each command may include the corresponding service route formatted for the corresponding service routing platform. That is, route update subsystem 116 may send the correctly formatted service route (e.g., in a platform specific format) to the corresponding service routing platform.

In some embodiments, instead of sending an update command, route update subsystem 116 may perform an update using an update operation available for the particular service routing platform. In particular, route update subsystem 116 may determine, based on the service route metadata, that a first service route of the plurality of service routes corresponds to a first service routing platform. That is, route update subsystem 116 may identify the service routing platform that matches a particular service route. Route update subsystem 116 may then determine, for the first service routing platform, that an update operation comprises a mapping enabling each service route to transmit requests to a destination. For example, the particular service routing platform may store the platform specific service routes within a mapping (e.g., in memory or on disk). That mapping may be updatable using the plugin. Thus, route update subsystem 116 may perform a mapping update to include the first service route of the plurality of service routes within the mapping. That is, route update subsystem 116 may insert into the mapping the new service route.

In some embodiments, route update subsystem 116 may update the mapping when a particular service route is removed from a particular service routing platform or otherwise modified. In particular, route update subsystem 116 may determine that a first platform specific service route within the platform agnostic route repository has been modified to remove the first service routing platform from the service route. As discussed above, the platform agnostic route repository may be monitored (e.g., by the plugin and/or by format transform subsystem 114). If a request is received to update an existing service route (e.g., remove a particular service routing platform), the platform agnostic route repository may be modified first (e.g., by format transform subsystem 114). Format transform subsystem 114 may then update the one or more native route repositories. For example, format transform subsystem 114 may remove a service route from a particular native route repository if the corresponding service routing platform is removed from the service route within the platform agnostic route repository.

Route update subsystem 116 may be monitoring for the updates (e.g., with the native route repositories and/or the platform agnostic route repository), and when an update is received (e.g., service route removed), route update subsystem 116 may perform an update of a mapping between service routes and corresponding services to remove the first service route of the plurality of service routes within the mapping. For example, a plugin may monitor for the updates and then update the mapping to remove or modify the service route. In some embodiments route update subsystem 116 may update the native route repository to remove the first platform specific service route.

In some embodiments, route update subsystem 116 may update the mapping (or multiple mappings) when a service route is added to a particular service routing platform or multiple routing platforms. In particular, route format transform subsystem 114 may determine that a first service route within a platform agnostic repository has been modified to add an additional service routing platform. For example, format transform subsystem 114 may be monitoring the platform agnostic repository for any updates. When an update is detected, format transform subsystem 114 may perform the corresponding operations.

In this instance, format transform subsystem 114 may perform a transform to generate a new platform specific service route. In particular, format transform subsystem 114 may transform, using corresponding transform code, the first service route into a first platform specific service route. The first platform specific service route may be transformed into a format associated with a first service routing platform. For example, format transform subsystem 114 may generate a platform specific service route for the service routing platform to which the service route will be added. Format transform subsystem 114 may then update the native route repository with the first platform specific service route. When the native route repository has been updated, route update subsystem 116 may detect a new service route within the native route repository and use that new service route to update the corresponding service routing platform. For example, route update subsystem 116 may update the mapping of service routes within the service routing platform.

In some embodiments, the route configuration system 102 may seamlessly handle adding a new service routing platform to the environment. Route configuration system 102 may need a corresponding transport code to perform the addition of the new service routing platform. In particular, format transform subsystem 114 may detect that a new service routing platform has been activated. For example, a device and/or software with a new service routing platform may be added to the environment. Format transform subsystem 114 (e.g., via communication subsystem 112) may be notified of the new service routing platform.

When the new service routing platform is recognized by format transform subsystem 114, format transform subsystem 114 may identify, within a platform agnostic route repository, a set of standardized service routes designated for the new service routing platform. For example, when a new service routing platform is added to the environment, a user or a system may update the platform agnostic route repository to mark service routes within the platform agnostic route repository that need to be configured on the new service routing platform. Thus, format transform subsystem 114 may identify those routes based on that data (e.g., as shown in FIG. 3).

Once the service routes are identified, those service routes may be transformed into platform specific service routes. In particular, format transform subsystem 114 may transform, using new transform code, the set of standardized service routes from the standardized format into a format corresponding to the new service routing platform to generate platform specific service routes. For example, format transform subsystem 114 may retrieve the new transform code (e.g., transform code associated with the new service routing platform) and use that new platform code to transform each service route needed for the new service routing platform. Format transform subsystem 114 may then store the platform specific service routes in a corresponding native route repository.

When the new platform specific service routes are stored within the native route repository (e.g., within a database), route update subsystem 116 may detect the new platform specific service routes and may install those services routes into the new service routing platform.

Figure 4:
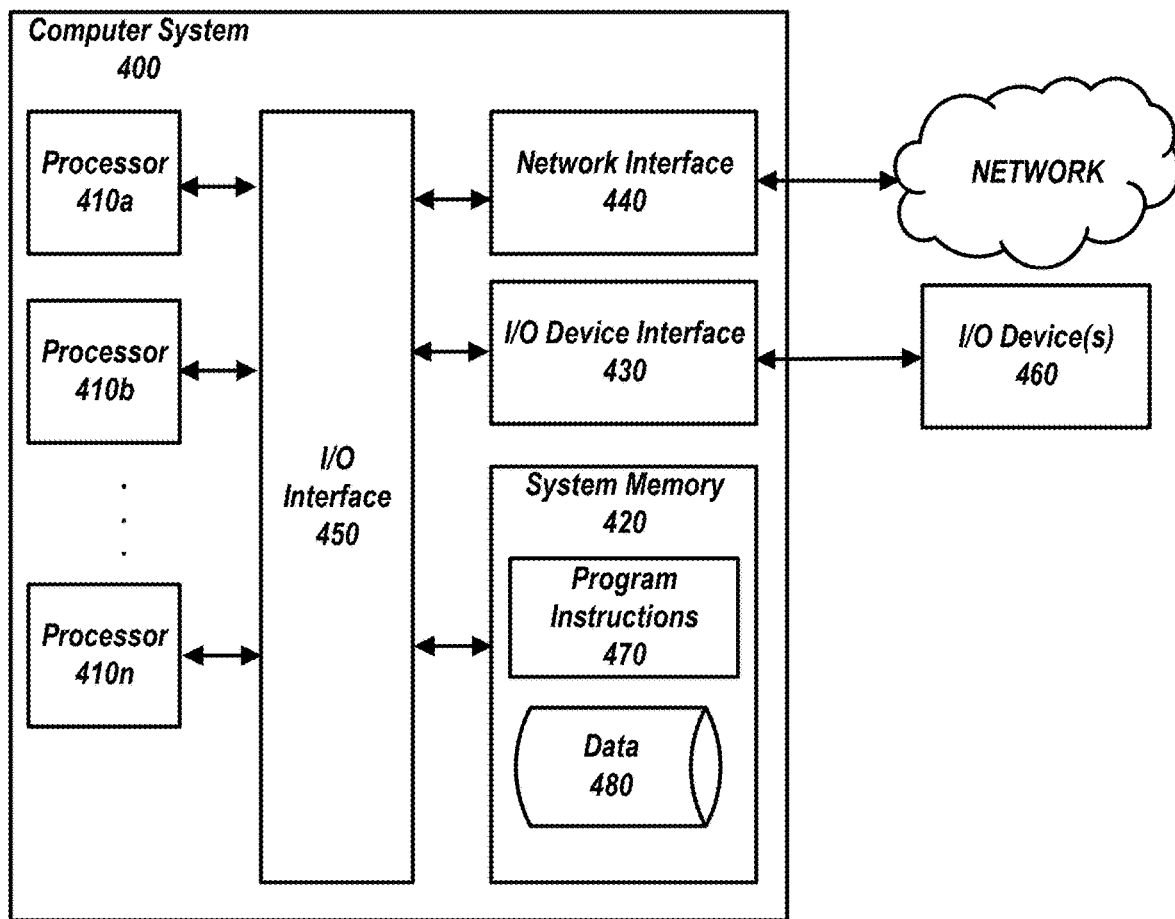
FIG. 4 shows an example computing system that may be used in accordance with some embodiments of this disclosure.

FIG. 4 is a diagram that illustrates an exemplary computing system 400 in accordance with embodiments of the present technique. Various portions of systems and methods described herein may include or be executed on one or more computer systems similar to computing system 400. Further, processes and modules described herein may be executed by one or more processing systems similar to that of computing system 400.

Computing system 400 may include one or more processors (e.g., processors 410*a*-410*n*) coupled to system memory 420, an input/output (I/O) device interface 430, and a network interface 440 via an I/O interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a uni-processor system including one processor (e.g., processor 410*a*) or a multi-processor system including any number of suitable processors (e.g., processors 410*a*-410*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on a remote computer system, for example, may be connected to computing system 400 via a network and network interface 440.

Network interface 440 may include a network adapter that provides for connection of computing system 400 to a network. Network interface 440 may facilitate data exchange between computing system 400 and other devices connected to the network. Network interface 440 may support wired or wireless communication. The network may include an electronic communication network, such as the Internet, a LAN, a WAN, a cellular communications network, or the like.

System memory 420 may be configured to store program instructions 470 or data 480. Program instructions 470 may be executable by a processor (e.g., one or more of processors 410a-410n) to implement one or more embodiments of the present techniques. Program instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 420 may include a non-transitory, computer-readable storage medium that may have program instructions stored thereon that are executable by a computer processor (e.g., one or more of processors 410a-410n) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410a-410n, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410a-410n). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computing systems 400 configured to host different portions or instances of embodiments. Multiple computing systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or in storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals, such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 5:
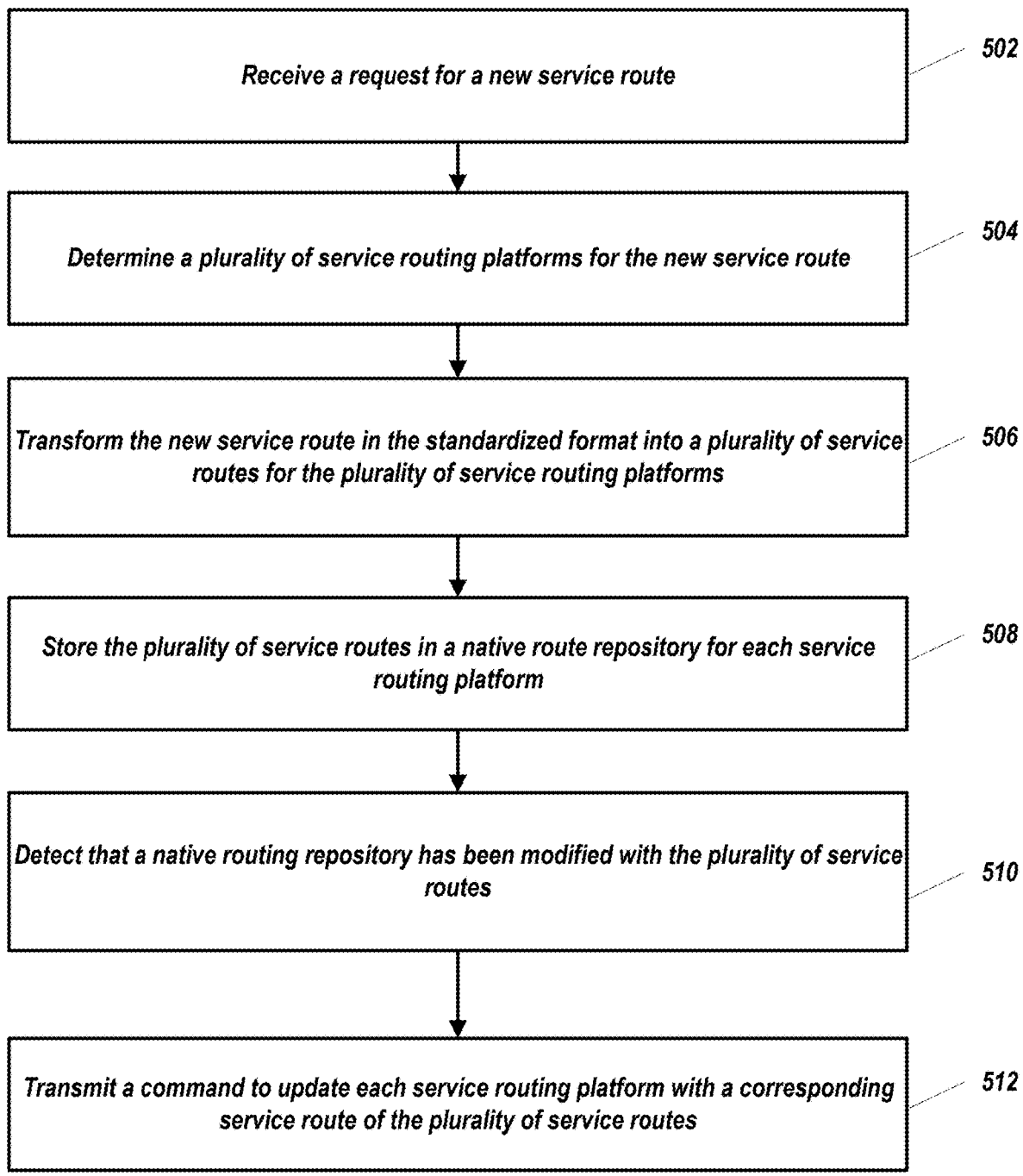
FIG. 5 shows an example flowchart of operations for providing route updates for service routing platforms, in accordance with some embodiments of this disclosure.

FIG. 5 shows an example flowchart 500 for providing route updates for service routing platforms. At 502, route configuration system 102 receives a request for a new service route. For example, route configuration system 102 may be hosted on a computing system 400. Thus, the new service route may be received through network interface 440 via network 150 and then passed via I/O interface 450 to system memory 420. At 504, route configuration system 102 (e.g., using one or more components in system 100 (FIG. 1) and/or computing system 400 via one or more processors 410a-410n and system memory 420 (FIG. 4)) determines a plurality of service routing platforms for the new service route. At 506, route configuration system 102 (e.g., using one or more components in system 100 (FIG. 1) and/or computing system 400 via one or more processors 410a-410n, I/O interface 450, and/or system memory 420 (FIG. 4)) transforms the new service route in the standardized format into a plurality of service routes for the plurality of service routing platforms.

At 508, route configuration system 102 (e.g., using one or more components in system 100 (FIG. 1) and/or computing system 400 via one or more processors 410a-410n (FIG. 4)) stores the plurality of service routes in a native route repository for each service routing platform. At 510, route configuration system 102 (e.g., using one or more components in system 100 (FIG. 1) and/or computing system 400 (FIG. 4)) detects that a native routing repository has been modified with the plurality of service routes. At 512, route configuration system 102 (e.g., using one or more components in system 100 (FIG. 1) and/or computing system 400 via the network interface 440 (FIG. 4)) transmits a command to update each service routing platform with a corresponding service route of the plurality of service routes.

It is contemplated that the actions or descriptions of FIG. 5 may be used with any other embodiment of this disclosure. In addition, the actions and descriptions described in relation to FIG. 5 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-4 could be used to perform one or more of the actions in FIG. 5.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to cost constraints, some features disclosed herein may not be presently claimed and may be claimed in later filings, such as continuing applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to) rather than the mandatory sense (i.e., meaning must). The words "include," "including," and "includes," and the like mean "including, but not limited to." As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompass both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing service route updates for service routing platforms, the method comprising: receiving, from an operator, a request for a new service route, wherein the new service route enables an application programming interface to route incoming service requests via the new service route, and wherein the request comprises the new service route in a standardized format; determining, based on service route metadata associated with the new service route, a plurality of service routing platforms for the new service route; transforming the new service route in the standardized format into a plurality of service routes for the plurality of service routing platforms, wherein each service route of the plurality of service routes is transformed into a corresponding format compatible with a corresponding service routing platform; storing the plurality of service routes in a native route repository for each service routing platform; detecting that a native routing repository has been modified with the plurality of service routes, wherein the native routing repository stores service routes in a platform specific format; and transmitting, to the plurality of service routing platforms, a command to update each service routing platform with a corresponding service route of the plurality of service routes.

2. The method of any of prior embodiments, further comprising matching each service route of the plurality of service routes with the corresponding service routing platform of the plurality of service routing platforms.

3. The method of any of prior embodiments, wherein the new service route has corresponding service route metadata indicating one or more service routing platforms for the new service route, and wherein each service routing platform of the plurality of service routing platforms is associated with corresponding transform code.

4. The method of any of prior embodiments, wherein each service route of the plurality of service routes comprises one or more indications of the corresponding service routing platform.

5. The method of any of prior embodiments, further comprising: detecting that a new service routing platform has been activated; identifying, within a platform agnostic route repository, a set of standardized service routes designated for the new service routing platform; transforming, using new transform code, the set of standardized service routes from the standardized format into a format corresponding to the new service routing platform to generate platform specific service routes; and storing the platform specific service routes in a corresponding native route repository.

6. The method of any of prior embodiments, wherein transmitting the command to update each routing platform further comprises: determining, based on the service route metadata, that a first service route of the plurality of service routes corresponds to a first service routing platform; determining, for the first service routing platform, that an update operation comprises a mapping enabling each service route to transmit requests to a destination; and performing a mapping update to include the first service route of the plurality of service routes within the mapping.

7. The method of any of prior embodiments, further comprising: determining that a first service route within a platform agnostic repository has been modified to add an additional service routing platform; transforming, using corresponding transform code, the first service route into a first platform specific service route, wherein the first platform specific service route is transformed into a format associated with a first service routing platform; and updating the native route repository with the first platform specific service route.

8. The method of any of prior embodiments, further comprising: determining that the first platform specific service route within the platform agnostic repository has been modified to remove the first service routing platform; performing a mapping update to remove the first service route of the plurality of service routes within a mapping of the service routes and services; and updating the native route repository to remove the first platform specific service route.

9. A tangible, non-transitory, machine-readable medium storing instructions that, when executed by a data processing apparatus, cause the data processing apparatus to perform operations comprising those of any of embodiments 1-8.

10. A system comprising: one or more processors; and memory storing instructions that, when executed by the processors, cause the processors to effectuate operations comprising those of any of embodiments 1-8.

11. A system comprising means for performing any of embodiments 1-8.

What is claimed is:

1. A system for providing route updates for service routing platforms, the system comprising:
   one or more processors; and
   a non-transitory, computer-readable storage medium storing instructions, which when executed by the one or more processors cause the one or more processors to:
      receive, from an operator, a request for a new service route, wherein the new service route enables an application programming interface to route incoming service requests via the new service route to a corresponding service provider, and wherein the request comprises the new service route in a standardized format having service route metadata;

determine, based on the service route metadata, a plurality of service routing platforms for using the new service route, wherein each service routing platform of the plurality of service routing platforms is associated with corresponding transform code;

transform, using each corresponding transform code, the new service route in the standardized format into a plurality of service routes for the plurality of service routing platforms, wherein each service route of the plurality of service routes is transformed, using the corresponding transform code, into a corresponding format compatible with a corresponding service routing platform, and wherein each service route of the plurality of service routes comprises a first indication of the corresponding service routing platform;

store (1) the new service route in the standardized format within a platform agnostic route repository and (2) the plurality of service routes in a native route repository for each service routing platform;

detect that the native route repository has been modified with the plurality of service routes;

match each service route of the plurality of service routes with the corresponding service routing platform of the plurality of service routing platforms; and transmit, to each of the plurality of service routing platforms, a corresponding command to update each service routing platform with a corresponding service route of the plurality of service routes, wherein each command comprises the corresponding service route formatted for the corresponding service routing platform.

2. The system of claim 1, wherein the instructions further cause the one or more processors to:

detect that a new service routing platform has been activated;

identify, within the platform agnostic route repository, a set of service routes designated for the new service routing platform;

transform, using new transform code, the set of service routes from the standardized format into a format corresponding to the new service routing platform to generate platform specific service routes; and store the platform specific service routes in a corresponding native route repository.

3. The system of claim 1, wherein the instructions for transmitting the corresponding command to update each routing platform further cause the one or more processors to:

determine, based on the service route metadata, that a first service route of the plurality of service routes corresponds to a first service routing platform;

determine, for the first service routing platform, that an update operation comprises a mapping enabling each service route to transmit requests to a destination; and perform a mapping update to include the first service route of the plurality of service routes within the mapping.

4. The system of claim 1, wherein the instructions further cause the one or more processors to:

determine that a first service route within the platform agnostic route repository has been modified to add an additional service routing platform;

transform, using the corresponding transform code, the first service route into a platform specific service route, wherein the platform specific service route is transformed into a format associated with a first service routing platform; and update the native route repository with the platform specific service route.

5. The system of claim 4, wherein the instructions further cause the one or more processors to:

determine that a first platform specific service route within the platform agnostic route repository has been modified to remove the first service routing platform;

perform an update of a mapping between service routes and corresponding services to remove the first service route of the plurality of service routes within the mapping; and update the native route repository to remove the first platform specific service route.

6. The system of claim 1, wherein each service routing platform of the plurality of service routing platforms is updated without having to perform a restart operation.

7. A method for providing service route updates for service routing platforms, the method comprising:

receiving, from an operator, a request for a new service route, wherein the new service route is configured for routing to a corresponding service provider via an application programming interface, and wherein the request comprises the new service route in a standardized format;

determining, based on service route metadata associated with the new service route, a plurality of service routing platforms for the new service route;

transforming the new service route in the standardized format into a plurality of service routes for the plurality of service routing platforms, wherein each service route of the plurality of service routes is transformed into a corresponding format compatible with a corresponding service routing platform;

storing the plurality of service routes in a native route repository for each service routing platform;

detecting that a native routing repository has been modified with the plurality of service routes, wherein the native routing repository stores service routes in a platform specific format; and transmitting, to the plurality of service routing platforms, a command to update each service routing platform with a corresponding service route of the plurality of service routes.

8. The method of claim 7, further comprising matching each service route of the plurality of service routes with the corresponding service routing platform of the plurality of service routing platforms.

9. The method of claim 7, wherein the new service route has corresponding service route metadata indicating one or more service routing platforms for the new service route, and wherein each service routing platform of the plurality of service routing platforms is associated with corresponding transform code.

10. The method of claim 9, wherein each service route of the plurality of service routes comprises one or more indications of the corresponding service routing platform.

11. The method of claim 7, further comprising:

detecting that a new service routing platform has been activated;

identifying, within a platform agnostic route repository, a set of standardized service routes designated for the new service routing platform;

transforming, using new transform code, the set of standardized service routes from the standardized format into a format corresponding to the new service routing platform to generate platform specific service routes; and storing the platform specific service routes in a corresponding native route repository.

12. The method of claim 7, wherein transmitting the command to update each routing platform further comprises:

determining, based on the service route metadata, that a first service route of the plurality of service routes corresponds to a first service routing platform;

determining, for the first service routing platform, that an update operation comprises a mapping enabling each service route to transmit requests to a destination; and performing a mapping update to include the first service route of the plurality of service routes within the mapping.

13. The method of claim 7, further comprising:

determining that a first service route within a platform agnostic repository has been modified to add an additional service routing platform;

transforming, using corresponding transform code, the first service route into a first platform specific service route, wherein the first platform specific service route is transformed into a format associated with a first service routing platform; and updating the native route repository with the first platform specific service route.

14. The method of claim 13, further comprising:

determining that the first platform specific service route within the platform agnostic repository has been modified to remove the first service routing platform;

performing a mapping update to remove the first service route of the plurality of service routes within a mapping of the service routes and services; and updating the native route repository to remove the first platform specific service route.

15. One or more non-transitory, computer-readable storage media storing instructions thereon, which when executed by one or more processors cause the one or more processors to perform operations comprising:

receiving, from an operator, a request for a new service route, wherein the new service route enables an application programming interface to route incoming service requests via the new service route, and wherein the request comprises the new service route in a standardized format;

determining, based on service route metadata associated with the new service route, a plurality of service routing platforms for the new service route;

transforming the new service route in the standardized format into a plurality of service routes for the plurality of service routing platforms, wherein each service route of the plurality of service routes is transformed into a corresponding format compatible with a corresponding service routing platform;

storing the plurality of service routes in a native route repository for each service routing platform;

detecting that a native routing repository has been modified with the plurality of service routes, wherein the native routing repository stores service routes in a platform specific format; and transmitting, to the plurality of service routing platforms, a command to update each service routing platform with a corresponding service route of the plurality of service routes.

16. The one or more non-transitory, computer-readable storage media of claim 15, wherein the new service route has corresponding service route metadata indicating one or more service routing platforms for the new service route, and wherein each service routing platform of the plurality of service routing platforms is associated with corresponding transform code.

17. The one or more non-transitory, computer-readable storage media of claim 15, wherein the instructions further cause the one or more processors to:

detect that a new service routing platform has been activated;

identify, within a platform agnostic route repository, a set of standardized service routes designated for the new service routing platform;

transform, using new transform code, the set of standardized service routes from the standardized format into a format corresponding to the new service routing platform to generate platform specific service routes; and store the platform specific service routes in a corresponding native route repository.

18. The one or more non-transitory, computer-readable storage media of claim 15, wherein the instructions for transmitting the command to update each routing platform further cause the one or more processors to:

determine, based on the service route metadata, that a first service route of the plurality of service routes corresponds to a first service routing platform;

determine, for the first service routing platform, that an update operation comprises a mapping enabling each service route to transmit requests to a destination; and perform a mapping update to include the first service route of the plurality of service routes within the mapping.

19. The one or more non-transitory, computer-readable storage media of claim 15, wherein the instructions further cause the one or more processors to perform operations comprising:

determining that a first service route within a platform agnostic repository has been modified to add an additional service routing platform;

transforming, using corresponding transform code, the first service route into a first platform specific service route, wherein the first platform specific service route is transformed into a format associated with a first service routing platform; and updating the native route repository with the first platform specific service route.

20. The one or more non-transitory, computer-readable storage media of claim 19, wherein the instructions further cause the one or more processors to perform operations comprising:

determining that the first platform specific service route within the platform agnostic repository has been modified to remove the first service routing platform;

performing a mapping update to remove the first service route of the plurality of service routes within a mapping of the service routes and services; and updating the native route repository to remove the first platform specific service route.

* * * * *